United States Patent [19]

Utsumi et al.

[11] Patent Number: 5,318,823
[45] Date of Patent: Jun. 7, 1994

[54] POLYESTER MULTILAYERED FILM FOR HIGH-DENSITY MAGNETIC DISC

[75] Inventors: Shigeo Utsumi, Yamato; Masashi Inagaki, Tsukui; Yuko Watanuki, Tokyo, all of Japan

[73] Assignee: Diafoil Hoechst Company, Limited, Tokyo, Japan

[21] Appl. No.: 906,294

[22] Filed: Jul. 1, 1992

[30] Foreign Application Priority Data

Jul. 4, 1991 [JP] Japan .................................. 3-164710

[51] Int. Cl.$^5$ ........................... B32B 5/16; D06N 7/04
[52] U.S. Cl. .................................. 428/143; 428/323; 428/327; 428/331; 428/480; 428/694 BR; 428/694 SG
[58] Field of Search ............... 428/323, 327, 331, 480, 428/694, 900, 694 BR, 694 SG, 143

[56] References Cited

U.S. PATENT DOCUMENTS

| | | | |
|---|---|---|---|
| 4,198,458 | 4/1980 | Mitsuishi et al. | 428/212 |
| 4,568,599 | 2/1986 | Ono et al. | 428/141 |
| 4,615,939 | 10/1986 | Corsi et al. | 428/323 |
| 4,680,217 | 7/1987 | Kanesaki et al. | 428/141 |
| 4,732,814 | 3/1988 | Hatada et al. | 428/400 |
| 4,865,898 | 9/1989 | Fukuda et al. | 428/141 |
| 5,045,379 | 9/1991 | Kotani et al. | 428/156 |
| 5,069,962 | 12/1991 | Okazaki et al. | 428/323 |

FOREIGN PATENT DOCUMENTS

| | | |
|---|---|---|
| 0088635 | 9/1983 | European Pat. Off. |
| 0229346 | 7/1987 | European Pat. Off. |
| 0347646 | 12/1989 | European Pat. Off. |
| 62-131036 | 6/1987 | Japan ........................ B29C 55/12 |
| 2173731 | 5/1986 | United Kingdom. |

OTHER PUBLICATIONS

Patent Abstracts of Japan, JP-A-01 032 423 (Diafoil Co. Ltd.). Feb. 1989.

Primary Examiner—Paul J. Thibodeau
Assistant Examiner—H. Thi Le
Attorney, Agent, or Firm—Foley & Lardner

[57] ABSTRACT

A multilayered polyester film for high-density magnetic discs, comprising a layer of polyester (A) and a layer of polyester (B) having a thickness of not more than 3 μm, being laminated on at least one side of the layer of polyester (A) and having specific surface characteristics.

6 Claims, No Drawings

POLYESTER MULTILAYERED FILM FOR HIGH-DENSITY MAGNETIC DISC

BACKGROUND OF THE INVENTION

The present invention relates to a polyester multilayered film for high-density magnetic discs. More particularly, the present invention relates to a polyester multilayered film which has excellent surface properties, and is lowered in falling-off of particles in use and also high in scratch durability.

Magnetic discs, especially floppy discs are being more and more densified recently. The floppy discs having a memory capacity of 4 MB are now commercially available, and attempts are being made for realizing a floppy disc whose the memory capacity exceeds 10 MB. Accompanied with such densification of floppy discs, the request for the improvement of the properties of a base film for floppy discs has become strong - especially the request for the improvement of the surface properties of the base film is most exacting.

In the currently available base films for high-density floppy discs, there are mostly added to the base films the $TiO_2$ particles having characteristics which lower the formation of coarse protuberances while increasing the protuberance density in the film surface. By adding $TiO_2$ particles, the surface properties of the film can be indeed improved, but such film has the problem that the added particles tend to fall off and the fell-off particles would become a cause of drop out, resulting in a reduced productivity of floppy discs. It has been also pointed out that the film using the $TiO_2$ particles is susceptible to fine scratches, and this has become a serious problem with raising of disc density.

As a result of earnest studies for dissolving the said problems, it has been found that by laminating a layer of polyester (B) on at least one side of a layer of polyester (A) by the coextrusion method so as to have surface properties represented by the formulae (1) to (3) and the thickness of not more than 3 μm, the obtained polyester multilayered film has excellent surface properties as well as high scratch durability and abrasion resistance, and is useful as base film for high-density magnetic discs:

$$0.002 \leq Ra \leq 0.015 \quad (1)$$

$$F_3 = 0 \quad (2)$$

$$50 \leq Pc \quad (3)$$

[wherein the Ra is a center line average roughness (μm) of the surface of the layer of polyester (B); the $F_3$ is the number of the protuberances having a height of 0.81 μm or greater, counted per 25 cm² in the surface of the layer of polyester (B); and the Pc is a peak count (number of peaks per 0.8 mm) in the surface of the layer of polyester (B)].

The present invention was achieved on the basis of the above finding.

SUMMARY OF THE INVENTION

In an aspect of the present invention, there is provided a polyester multilayered film for high-density magnetic discs, comprising a layer of polyester (A) and a layer of polyester (B) having surface characteristics represented by the following formulae (1) to (3) and a thickness of 3 μm or less, and being laminated on at least one side of said layer of polyester (A):

$$0.002 \leq Ra \leq 0.015 \quad (1)$$

$$F_3 = 0 \quad (2)$$

$$50 \leq Pc \quad (3)$$

[wherein the Ra is a center line average roughness (μm) of the surface of the layer of polyester (B); the $F_3$ is the number of the protuberances having a height of 0.81 μm or greater, counted per 25 cm² in the surface of the layer of polyester (B); and the Pc is a peak count (number of peaks per 0.8 mm) in the surface of the layer of polyester (B)].

DETAILED DESCRIPTION OF THE INVENTION

The polyesters used for the layer of polyester (A) and the layer of polyester (B) in the present invention are the polymers obtainable by polycondensing aromatic dicarboxylic acids such as terephthalic acid, naphthalene-2,6-dicarboxylic acid, etc., and aliphatic glycols such as ethylene glycol, diethylene glycol, tetramethylene glycol, neopentyl glycol, etc. Typical examples of such polymers are polyethylene terephthalate (PET) and polyethylene-2,6-naphthalene dicarboxylate (PEN).

It is possible to use not only the homopolymers thereof, but also the polymers obtained by copolymerizing with other aromatic or aliphatic dicarboxylic acids, diols, etc., in an amount not affecting crystallizability, for example not more than 10 mol %, preferably not more than 5 mol %. It is also possible to blend other polymer such as a polyamide, a polyolefin, a polycarbonate, etc., in an amount not more than 10 wt %. However, it is undesirable to blend a polymer which has the possibility of excessively reducing crystallizability of the composition or excessively roughening the produced film surface.

The layer of polyester (A) constituting the film of the present invention may contain the particles in the range of without giving any disadvantageous effect to the exposed surface of the layer of polyester (B), but usually the layer of polyester (A) is the one which is substantially free of particles. The term "substantially free" used here denotes that the content of the particles, if any, is not more than 0.05 wt %. The layer of polyester (A) may contain an additive(s) such as organic lubricant, stabilizer, coloring agent, antioxidant, defoaming agent, antistatic agent, etc., if necessary.

Also, a recycled resin or coating-film recycled resin may be contained in the layer of polyester (A).

The thickness of the layer of polyester (A) is 32 to 99.9 μm, preferably 57 to 65 μm.

The layer of polyester (B) of another constituent of the polyester film of the present invention, is not more than 3 μm, preferably 0.1 to 1 μm in thickness. If the thickness of this layer exceeds 3 μm, uniformity of the layer surface tends to deteriorate. In the layer of polyester (B), fine organic or inorganic particles are usually contained for imparting slipperiness to the layer. As such fine particles, there can be used, for instance, the known inert external (additive) particles such as kaolin, clay, calcium carbonate, silicon oxide, spherical silica, colloidal silica, calcium terephthalate, aluminum oxide, titanium oxide, calcium phosphate, lithium fluoride, carbon black, etc., and the internal particles formed in the inside of the polymer, in the course of preparation of polyester, by the high-melting point organic compounds which are infusible at the time of melt film-forming of polyesters, the crosslinked polymers such as monodisperse organic particles and the metal compound catalysts (alkali metal compounds, alkaline earth metal compounds, etc.) used in the synthesis of polyester.

A center line average roughness (Ra) of the surface of the layer of polyester (B) is in the range of 0.002 to 0.015 μm, preferably 0.004 to 0.011 μm, more preferably 0.005 to 0.008 μm. If the Ra is less than 0.002 μm, the running property of the film are poor and, therefore, the handling property of the film in the magnetic disc production process are deteriorated. On the other hand, if the Ra exceeds 0.015 μm, it is difficult to meet the request for increased density.

No protuberances having a height of not less than 0.81 μm exist in the surface of the layer of polyester (B).

The peak count (Pc) of the surface of the layer of polyester (B) is not less than 50 peaks/0.8 mm, preferably not less than 75 peaks/0.8 mm, more preferably not less than 100 peaks/0.8 mm. If the Pc is less than 50 peaks/0.8 mm, the uniformity of the protuberances in the surface of the layer of polyester (B) are inferior, resulting in unfavorable for practical use of the film. For realizing a desired surface profile of the layer of polyester (B) such as mentioned above, usually the particles are contained in the layer of polyester (B) in an amount of not less than 0.5 wt %, preferably 1.0 to 10.0 wt %, more preferably 1.5 to 3.0 wt % based on the polyester (B).

The size, amount and kind of the particles to be contained in the layer of polyester (B) may be properly selected from within the ranges that would provide the said surface profile of the polyester (B) layer. It is preferable, however, that the fine particles having a primary particle size of 1 to 100 nm be contained in an amount of not less than 0.5 wt %, preferably 1.0 to 10.0 wt %. If the particles having a primary particle size of less than 1 nm are used, since the necessary amount of the particles increases, the tendency of agglomeration and coarsening of the particles intensifies. On the other hand, if the primary particle size exceeds 100 nm, the particles tend to fall off.

When the primary particle size is within the above-defined range, the particles cohere moderately to each other to form the secondary particles and are free from falling off the film.

Preferred examples of such particles for use in the present invention are colloidal silica and carbon black. Carbon black is especially preferred as it has little possibility of falling off the film.

It is also preferable for the film of the present invention that the coefficient of thermal expansion ($\alpha_T$) in plane is $(1.7 \pm 0.4) \times 10^{-5}/°$ C. and the shrinkage factor of the film after being kept under the conditions of 60° C. and 80% RH for 72 hours is not more than 0.05% in any direction in plane.

As a method for producing a multilayered film according to the present invention, there can be used various known methods such as coextrusion method, extrusion laminating method, dry laminating method, etc. Especially, coextrusion method is useful for forming a thin film and also advantageous in productivity.

A film-forming method using the coextrusion method is described below as a representative embodiment of the present invention.

Polyester (A) and polyester (B), each of which may contain an appropriate amount of inorganic, etc. as lubricant, are first dried by an appropriate means such as hopper dryer, bubble dryer, vacuum dryer, etc. Then, by using the separate extruders, the said two kinds of polyester are melted at 200°–320° C., joined in a passageway or the slot die and extruded in two or three layers, followed by quick cooling to obtain a non-stretched film. For extrusion, a conventional method such as T-die method, tubular method, etc., can be employed.

It is possible to control the ratio of thickness of the multilayered films by adjusting the discharge rates of the respective extruders at the time of extrusion. In case of using the T-die method when forming a non-stretched film, it is possible to obtain a film with uniform thickness by employing the so-called electrostatic pinning technique at the time of quick cooling. The non-stretched film thus-obtained is then stretched respectively not less than 2.0 times, preferably 2.5–9 times in both machine and transverse directions at a temperature in the range from Tg(A)–10° C. to Tc(A)–10° C. [wherein the Tg(A) denotes a glass transition temperature of polyester (A) and the Tc(A) denotes a crystallization temperature of polyester (A)], and the obtained biaxially oriented film is heat-set at a temperature of 180°–240° C.

The above heat-treatment is usually carried out under a tension-fixing state. The film may be subjected to relaxation or width adjustment with extension of not more than 20% in the machine and/or transverse direction of the film at the said heat-treatment and/or a cooling step after the heat-treatment. A corona discharge-treatment or a coating-treatment may be applied on one or both sides of the film during, before or after stretching step to improve adhesiveness of the film to the printed layers.

The thus-obtained film which is used as the base film for magnetic discs, preferably has a thickness in the range of 35 to 100 μm, more preferably 50 to 75 μm, most preferably 60 to 65 μm.

By forming a magnetic layer on the said polyester multilayered film of the present invention by coating method, vapor deposition method or sputtering method, there can be obtained a magnetic disc having excellent properties such as excellent slipperiness, abrasion resistance, etc., and high density.

The polyester mutilayered film according to the present invention is a film having an excellent surface properties as well as high scratch durability and abrasion resistance.

EXAMPLES

The present invention will be further described below with reference to the examples thereof. It is to be understood, however, that these examples are merely intended to be illustrative and not to be construed as limiting the scope of the invention.

Evaluation of the film was made by the methods described below.

(1) Average Surface Roughness (Ra)

Average surface roughness (Ra) was determined in the following way by using a surface roughness tester (SE-3PZ mfd. by Kosaka Kenkyusho Inc.). The radius at the tip of the stylus was 2 μm and the load applied thereto was 30 mg. A portion of the reference strength L (2.5 mm) was cut out in the direction of the center line from the sectional curve of the film. In the coordinates with the center line of the cut-out portion on the X-axis and the direction of longitudinal magnification on the Y-axis, and with the roughness curve expressed by y=f(x), the value given from the following formula was represented as surface roughness Ra (μm). The cut-off value was 80 μm, and the Ra was measured at 5 points in both longitudinal and transverse directions, and the average of the measurements at the total 10 points was calculated.

$$\frac{1}{L}\int_0^L |f(x)|dx$$

(2) Number of Coarse Protuberances

Aluminum was deposited on the film surface, and the number of coarse protuberances was counted by using a two-beam interference microscope. The number of the protuberances showing the interference fringes of the not less than 3rd orders at the measuring wavelength of 0.54 μm was calculated per 25 cm² and shown by the $F_3$.

(3) Peak Count

The measurement was carried out by using a surface roughness tester (SE-3F mfd. by Kosaka Kenkyusho Inc.) under the following conditions: cut-off: 0.08 mm, needle pressure: 30 mg, stylus radius: 2 μm, measuring length: 0.8 mm, height magnification: 50,000, and width magnification: 100.

As for the peak count, when there existed in succession two points which are rightwardly rising-crossing point the center line of the sectional curve and the roughness curve, they were assumed as one peak and the number of such peaks was counted for the measuring length of 0.8 mm.

(4) Generation of White Powder

White powder adhering to the feed roller in the stretched film reeler was visually observed and the evaluation was conducted according to the following three-grade criterion.

Observation was conducted at the point when 10,000 meters of film was taken up.

○: No white powder was generated.
△: A small quantity of white powder was generated.
×: A large amount of white powder was generated.

(5) Scratch Durability

After making a floppy disc by coating a magnetic layer on the polyester film, the magnetic layer was peeled off and the film surface was visually observed. The evaluation was conducted according to the following criterion.

○: No scratch mark was present on the film surface.
△: A small number of scratch marks was present on the film surface.
×: A lot of scratch marks were present on the film surface.

EXAMPLE 1

Preparation of Polyester Chips 100 parts of dimethyl terephthalate, 70 parts of ethylene glycol and 0.07 parts of calcium acetate monohydrate were supplied into a reactor. The mixture was heated to carry out an ester exchange reaction while evaporating away methanol. About 4.5 hours were required till reaching the temperature of 230° C. after starting the reaction. Upon reaching this temperature, the ester exchange reaction was substantially completed.

Then 0.04 parts of phosphoric acid and 0.035 parts of antimony trioxide were added to the reaction mixture, and the resultant mixture was polymerized according to a conventional method. The reaction temperature was raised gradually till finally reaching 280° C., while pressure was lowered gradually till finally reaching 0.5 mmHg. The reaction was completed for 4 hours, and the reaction product was made into chips according to the usual way to obtain a polyester ($A_1$) with an intrinsic viscosity ($\eta$) of 0.65.

Polyester ($A_1$) and the carbon black particles having an average diameter of 15 μm were kneaded by a double-screw kneader and the kneaded mixture was passed through a 1,000-mesh filter and then made into chips to obtain a masterbatch having a carbon black concentration equivalent to 10 wt % and [$\eta$]=0.60. The thus obtained masterbatch was designated polyester ($B_1$).

Production of Polyester Film

The polyester ($A_1$) used as the material for forming the layer of polyester (A), and the polyester ($B_1$) used as the material for forming the layer of polyester (B) were blended at a ratio of polyester ($A_1$)/polyester ($B_1$)=5/1.

Each of the polymers was dried and then melted at a temperature of 287° C. by a separate extruder. The molten polymers were joined in a passageway and quickly cooled to form a non-stretched film of a (B)/(A)/(B) three-layer structure. This non-stretched film was then stretched in both machine and transverse directions by a conventional method and heat-set at 200° C. to obtain a stretched-multilayered film having 62 μm in thickness. The thickness of each of the layers of polyester (B) was 1.0 μm. The $a_T$ in plane was $(1.7\pm0.4)\times10^{-5}/°$ C., and the irreversible shrinkage in plane after left at 60° C. and 80 RH for 72 hours was not more than 0.05%.

Comparative Example 1

A 19:1 blend of polyester ($A_1$) and polyester ($B_1$) was used as polyester layer material. After dried, the material was melted and extruded by an extruder to obtain a non-stretched film, and the thus-obtained film was stretched and heat-set by the conventional methods to obtain a stretched single-layer film having 62 μm in thickness.

Comparative Example 2

Preparation of Polyester Chips 100 parts of dimethyl terephthalate, 60 parts of ethylene glycol and 0.09 parts of magnesium acetate tetrahydrate was supplied into a reactor. The mixture was heated to carry out an ester exchange reaction while evaporating away methanol. The ester exchange reaction was substantially completed 4 hours after starting the reaction.

Then 0.3 wt % of titanium dioxide having an average particle size of 0.25 μm, which had been dispersed in ethylene glycol and subjected to a filtration-treatment, was added to the reaction product, followed by further addition of 0.04 parts of ethyl acid phosphate and 0.035 parts of antimony trioxide, and the resultant mixture was polycondensed for 4 hours to obtain a polyester (C) having an intrinsic viscosity of 0.66.

By using polyester (C) singly as material, there was obtained a stretched film having 62 μm in thickness by following the same film-forming process as Comparative Example 1.

Comparative Example 3

Preparation of Polyester Chips

By following the process of production of polyester (C) except for use of colloidal silica having a primary particle size of 30 nm instead of titanium dioxide with an average particle size of 0.25 μm, there was obtained polyester (D) containing 0.35 wt % of said silica particles. By using this polyester (D) singly as material, there was obtained a stretched film having 62 μm in thickness in the same way as Comparative Example 1.

The results obtained in above-described example and comparative examples are shown in Table 1.

TABLE 1

|                | Ra    | F3 | Pc  | Generation of white powder | Scratch durability |
|----------------|-------|----|-----|----------------------------|--------------------|
| Example 1      | 0.008 | 0  | 110 | O                          | O                  |
| Comp. Example 1| 0.009 | 30 | 40  | Δ                          | X                  |
| Comp. Example 2| 0.007 | 5  | 35  | X                          | Δ                  |
| Comp. Example 3| 0.008 | 80 | 42  | Δ                          | X                  |

What is claimed is:

1. A polyester multilayered film for high-density magnetic discs, comprising a base layer (A) of polyester and a particle containing layer (B) of polyester, wherein layer (B) has a thickness of not more than 3 μm, and wherein layer (B) is laminated to at least one side of layer (A) and wherein layer (B) has the surface characteristics represented by the following formulae (1)–(3):

$$0.002 \leq Ra \leq 0.015 \quad (1)$$
$$F_3 = 0 \quad (2)$$
$$50 \leq Pc \quad (3)$$

wherein Ra represents the center line average roughness in μm of the surface of layer (B), $F_3$ represents the number of protuberances per 25 cm$^2$ of the surface of layer (B) which protuberances have a height of 0.81 μm or greater, and Pc represents the peak count in peaks/0.8 mm in the surface of layer (B).

2. A film according to claim 1, wherein layer (A) and layer (B) each comprise a polycondensate of an aromatic dicarboxylic acid and an aliphatic glycol.

3. A film according to claim 1, wherein layer (B) comprises primary particles of organic or inorganic material or a mixture thereof, wherein the primary particles are in the size range of from 1 to 100 nm, and wherein the primary particles comprise between 0.5 and 10.0% by weight of layer (B).

4. A film according to claim 3, wherein said primary particles comprise colloidal silica and carbon black.

5. A film according to claim 1, wherein the thickness of layer (A) is in the range of from 32.0 to 99.9 μm, the thickness of layer (B) is in the range from 0.1 to 3.0 μm, and the thickness of the laminated multilayered film is in the range from 35.0 to 100.0 μm.

6. A film according to claim 1, produced by a coextrusion method.

* * * * *